United States Patent
Daugherty

(10) Patent No.: US 7,484,328 B1
(45) Date of Patent: Feb. 3, 2009

(54) FINGER MOUNTED INSECT DISSUASION DEVICE AND METHOD OF USE

(76) Inventor: John Richard Daugherty, 1647 N. Woodhollow Way, Flagstaff, AZ (US) 86004

( * ) Notice: Subject to any disclaimer, the term of this patent is extended or adjusted under 35 U.S.C. 154(b) by 122 days.

(21) Appl. No.: 11/080,023

(22) Filed: Mar. 15, 2005

Related U.S. Application Data

(63) Continuation-in-part of application No. 10/839,590, filed on May 5, 2004, now abandoned.

(51) Int. Cl.
*A01M 3/02* (2006.01)
*A01M 3/00* (2006.01)

(52) U.S. Cl. .......................... 43/137; 43/134
(58) Field of Classification Search ............ 43/137, 43/134
See application file for complete search history.

(56) References Cited

U.S. PATENT DOCUMENTS

| | | | | |
|---|---|---|---|---|
| 36,652 | A | | 10/1862 | Jacobs |
| 97,161 | A | * | 11/1869 | Buttles ........................ 43/134 |
| 160,606 | A | * | 3/1875 | Marsh ......................... 43/134 |
| 542,464 | A | * | 7/1895 | Chase .......................... 43/137 |
| 599,404 | A | * | 2/1898 | Robertson .................... 43/134 |
| 609,160 | A | * | 8/1898 | McWithey .................... 43/134 |
| 648,336 | A | * | 4/1900 | Bellamy .................. 273/317.2 |
| 974,887 | A | | 11/1910 | Huddle |
| 1,099,342 | A | * | 6/1914 | Copenhaver .................. 43/137 |
| 1,206,976 | A | | 12/1916 | Barth |
| 1,354,775 | A | * | 10/1920 | Moore ......................... 43/137 |
| 1,412,312 | A | * | 4/1922 | Little ........................... 43/137 |
| 1,479,046 | A | * | 1/1924 | Herbert ........................ 43/137 |
| 1,500,442 | A | * | 7/1924 | Cooper ........................ 43/137 |
| 1,639,559 | A | * | 8/1927 | Gatch .......................... 43/137 |
| 1,650,548 | A | * | 11/1927 | Sullivan ....................... 43/137 |
| 1,656,969 | A | * | 1/1928 | Adolph ........................ 43/137 |
| 1,660,011 | A | * | 2/1928 | Linding ....................... 43/137 |
| 1,662,264 | A | * | 3/1928 | Henderson ................... 43/137 |
| 1,763,205 | A | * | 6/1930 | Winbigler ................ 273/317.2 |
| 1,820,360 | A | * | 8/1931 | Meggitt ....................... 43/137 |
| 1,861,688 | A | * | 6/1932 | Crawford ..................... 43/137 |
| 1,942,252 | A | * | 1/1934 | Martin ......................... 43/137 |
| 1,967,384 | A | * | 7/1934 | Urbanek ....................... 43/137 |

(Continued)

FOREIGN PATENT DOCUMENTS

DE 29712704 U1 * 11/1997

(Continued)

*Primary Examiner*—Darren W Ark
(74) *Attorney, Agent, or Firm*—John R. Daugherty

(57) ABSTRACT

An insect dissuasion method that incorporates a miniature fly swatter adapted to be fixed onto an end of a human finger. An insect can be discouraged by simply flexing, slowly encroaching upon and then "flicking" the finger with the attached device to strike the insect. Devices of the present invention are designed to be removably attached to a finger by a ring-like structure. The ring-like structure is tailored to slip onto and engage a finger in various positions and remain attached to the finger when the finger is flicked. Joined to the ring-like structure is an extension shaft that terminates in an insect engagement head. The length and/or cross-sectional profile of the extension shaft can be altered as well as the shape of the head portion or ring-like structure.

3 Claims, 13 Drawing Sheets

U.S. PATENT DOCUMENTS

| | | | | |
|---|---|---|---|---|
| 2,015,092 | A | * | 9/1935 | Turnquist ..................... 43/137 |
| 2,022,615 | A | * | 11/1935 | Bennett et al. ................ 43/137 |
| 2,023,209 | A | * | 12/1935 | Platt ............................. 43/137 |
| 2,083,727 | A | * | 6/1937 | Matteson ..................... 43/137 |
| 2,096,940 | A | * | 10/1937 | Platt ............................. 43/137 |
| 2,122,901 | A | * | 7/1938 | Urbanek ....................... 43/137 |
| 2,126,311 | A | * | 8/1938 | Cowen ......................... 43/137 |
| 2,136,233 | A | * | 11/1938 | Brownson .................... 43/137 |
| 2,157,106 | A | * | 5/1939 | Baker ........................... 43/137 |
| 2,189,565 | A | * | 2/1940 | Jones ........................... 43/137 |
| 2,199,044 | A | * | 4/1940 | Creary .......................... 43/137 |
| 2,207,963 | A | * | 7/1940 | White ........................... 43/137 |
| 2,209,260 | A | * | 7/1940 | Cummings ................... 43/137 |
| 2,260,106 | A | * | 10/1941 | Miller ........................... 43/137 |
| 2,268,272 | A | * | 12/1941 | White ........................... 43/137 |
| 2,394,267 | A | * | 2/1946 | Sorkind ........................ 43/137 |
| 2,410,957 | A | * | 11/1946 | Briones ........................ 43/137 |
| 2,485,822 | A | * | 10/1949 | Goldrich ....................... 43/137 |
| 2,496,415 | A | * | 2/1950 | Sharpe .......................... 43/137 |
| 2,545,215 | A | * | 3/1951 | Sharpe .......................... 43/137 |
| 2,604,723 | A | * | 7/1952 | Bennett ......................... 43/137 |
| 2,618,882 | A | * | 11/1952 | Martin .......................... 43/137 |
| 2,624,149 | A | * | 1/1953 | Atkinson ...................... 43/137 |
| 2,651,878 | A | * | 9/1953 | Webbeking ................... 43/137 |
| 2,697,895 | A | * | 12/1954 | King ............................. 43/137 |
| 2,712,708 | A | * | 7/1955 | Hale ............................. 43/137 |
| 2,735,217 | A | * | 2/1956 | Hufnagel ....................... 43/137 |
| 2,806,320 | A | * | 9/1957 | Griffith ......................... 43/137 |
| 2,891,347 | A | * | 6/1959 | Swint ............................ 43/137 |
| 2,934,851 | A | * | 5/1960 | Grish ............................ 43/137 |
| 2,963,816 | A | * | 12/1960 | De Miller ..................... 43/137 |
| 3,005,441 | A | | 10/1961 | Glasscock |
| 3,402,984 | A | | 9/1968 | Zazzara |
| 3,412,501 | A | * | 11/1968 | Rosen ........................... 43/137 |
| 3,596,964 | A | | 8/1971 | Zazzara |
| 3,648,402 | A | * | 3/1972 | Siggers ......................... 43/137 |
| 4,095,793 | A | | 6/1978 | Ray |
| 4,120,114 | A | * | 10/1978 | Little et al. ................... 43/137 |
| 4,120,115 | A | * | 10/1978 | Mushkin ....................... 43/137 |
| 4,127,338 | A | | 11/1978 | Laybourne |
| 4,195,615 | A | * | 4/1980 | Belokin ........................ 43/135 |
| 4,291,874 | A | * | 9/1981 | Peterson ...................... 273/449 |
| 4,442,837 | A | * | 4/1984 | Keatley ........................ 43/134 |
| 4,502,243 | A | * | 3/1985 | Spindler ....................... 43/137 |
| 4,593,489 | A | * | 6/1986 | Gott et al. ..................... 43/137 |
| 4,674,227 | A | * | 6/1987 | Maier ........................... 43/137 |
| 4,694,605 | A | * | 9/1987 | Garcia et al. ................. 43/137 |
| 4,733,867 | A | | 3/1988 | Kemp et al. |
| 4,738,556 | A | | 4/1988 | Brown |
| 4,765,208 | A | | 8/1988 | Sakosky |
| 4,774,786 | A | | 10/1988 | Zaremba |
| 4,793,094 | A | * | 12/1988 | Weaver ......................... 43/137 |
| 4,797,974 | A | | 1/1989 | Smith, Jr. |
| 4,872,679 | A | | 10/1989 | Bohaski et al. |
| 4,910,909 | A | | 3/1990 | Johnson et al. |
| D311,050 | S | | 10/1990 | Lisitza |
| 5,027,549 | A | * | 7/1991 | Person ......................... 43/134 |
| 5,052,967 | A | | 10/1991 | Slatter et al. |
| 5,086,612 | A | | 2/1992 | Anderson |
| 5,110,127 | A | | 5/1992 | Potter |
| 5,242,164 | A | * | 9/1993 | Nicoll ...................... 273/317.1 |
| D349,940 | S | * | 8/1994 | Blaisdell ..................... D22/124 |
| 5,391,010 | A | | 2/1995 | Gorbunov |
| 5,405,206 | A | | 4/1995 | Bedol |
| D358,446 | S | * | 5/1995 | Cooper ....................... D22/124 |
| 5,492,046 | A | | 2/1996 | Jimenez |
| 5,586,407 | A | | 12/1996 | Raymond |
| 5,671,925 | A | | 9/1997 | Gonzalez |
| 5,709,385 | A | | 1/1998 | Fitzpatrick et al. |
| 5,722,575 | A | | 3/1998 | Smith |
| 5,794,377 | A | * | 8/1998 | Kensok et al. ................ 43/134 |
| 5,868,509 | A | | 2/1999 | Crutcher |
| 5,881,745 | A | * | 3/1999 | Landis ........................ 132/323 |
| 5,885,018 | A | | 3/1999 | Sato |
| D407,790 | S | | 4/1999 | Miceli |
| 5,971,642 | A | | 10/1999 | O'Mara et al. |
| D418,494 | S | | 1/2000 | Robb |
| 6,065,480 | A | * | 5/2000 | Mader ........................ 132/323 |
| 6,161,328 | A | * | 12/2000 | Sing ............................. 43/137 |
| 6,185,862 | B1 | * | 2/2001 | Nelson ......................... 43/137 |
| 6,247,992 | B1 | | 6/2001 | Higgins, III |
| 6,279,262 | B1 | * | 8/2001 | Walkemeyer ................. 43/137 |
| 6,367,797 | B1 | | 4/2002 | McKenna-Cress et al. |
| D464,103 | S | | 10/2002 | Jensen |
| 6,527,464 | B2 | | 3/2003 | Lee |
| 6,626,598 | B2 | | 9/2003 | Schneider |
| 6,631,723 | B1 | | 10/2003 | Mullin |
| 6,651,379 | B1 | | 11/2003 | Nelson |
| 6,669,388 | B1 | | 12/2003 | Short |
| 6,851,218 | B1 | * | 2/2005 | Conte ........................... 43/137 |
| 6,957,510 | B1 | * | 10/2005 | Kominkiewicz ............. 43/137 |
| 2001/0007392 | A1 | | 7/2001 | Sugarman |
| 2003/0131524 | A1 | | 7/2003 | Brown |

FOREIGN PATENT DOCUMENTS

| | | | |
|---|---|---|---|
| DE | 10320040 A1 | * | 12/2004 |
| EP | 461397 A1 | * | 12/1991 |
| GB | 1596043 A | * | 8/1981 |
| GB | 2124880 A | * | 2/1984 |
| GB | 2248166 A | * | 4/1992 |
| WO | WO 02/37959 A1 | * | 5/2002 |

* cited by examiner

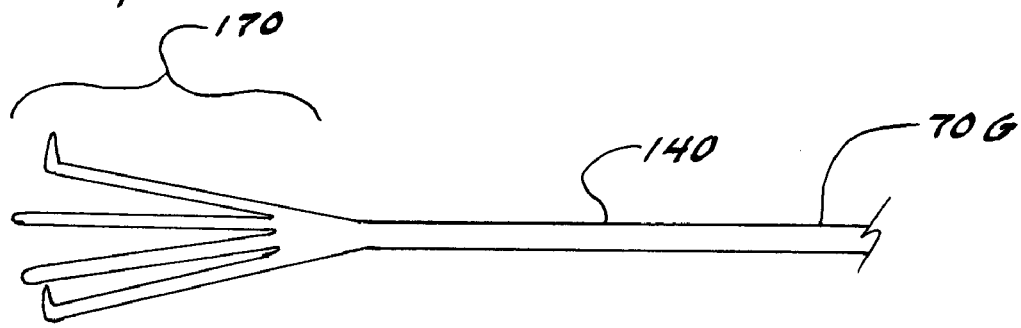
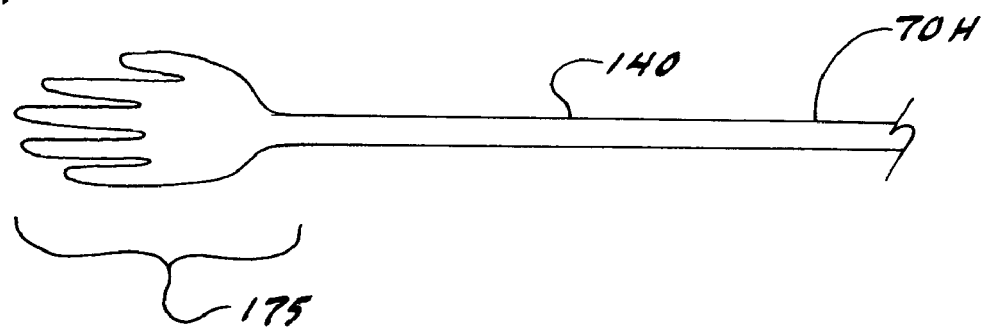
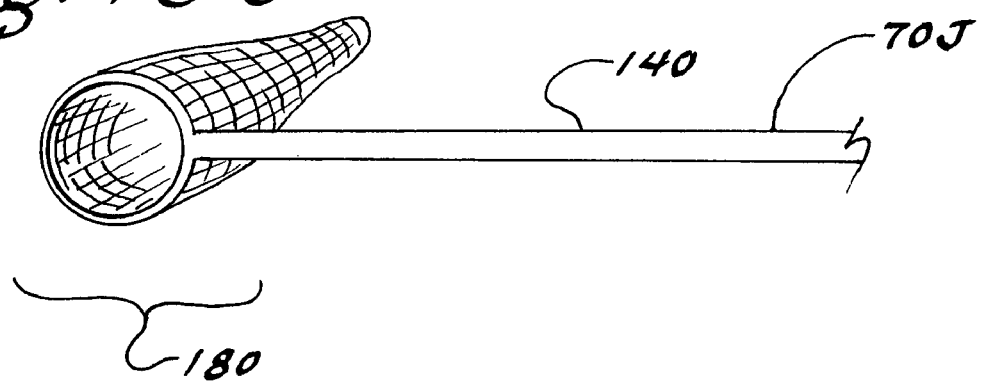

FINGER MOUNTED INSECT DISSUASION DEVICE AND METHOD OF USE

CROSS-REFERENCE TO RELATED APPLICATIONS

This application is a continuation in part and claims the benefit of U.S. application Ser. No. 10/839,590, filed May 5, 2004, now abandoned the contents of which are incorporated herein by this reference.

FIELD OF THE INVENTION

Devices and methods of the present invention relate to mechanical insect dissuasion devices and in particular to finger mounted fly swatters.

BACKGROUND OF THE INVENTION

During outdoor activities one is often annoyed or distracted by an insect. For example during static outdoor activities such as sun-tanning or reading, a single fly will often persist in annoyance despite repeated attempts to "discourage" the insect. Such an insect persistently fly's and lands on one's arm or leg for example. Conventional fly-swatters are cumbersome and due to hygiene concerns, are not well suited for "swatting" one's self. Often one uses their hand, book or other object to brush away and discourage the insect. Such attempts are most often ineffective since the insect simply fly's away and returns to a different location.

The present invention relates to finger-mounted devices and methods of using such devices to dissuade insects. There are several prior references disclosing various finger-mounted devices. Examples of these finger-mounted devices include toothbrushes, dental flossing devices, pens and writing instruments, string instrument picks, computer touch screen styluses and surgical instruments. None of these references disclose or suggest the use of such devices for the dissuasion of insects. In addition, the use of these devices in the manner presently claimed by the applicant would present hygiene concerns or destroy the intended use of the devices. U.S. Pat. No. 1,763,205 (Winbigler) and U.S. Pat. No. 648,336 (Bellamy) disclose finger-mounted game devices specifically used to propel miniature golf balls and are also devoid of any teaching or suggestion relating to the dissuasion of insects.

SUMMARY OF THE INVENTION

The present invention is an insect dissuasion device that resembles a miniature fly swatter adapted to be fixed onto an end of a human finger. When a device of the present invention is attached for example onto an index finger, normal activities such as holding a book or a drink container are unimpeded. An insect can be spontaneously discouraged by simply flexing, slowly encroaching upon and then "flicking" the finger and the attached device of the present invention. Due to the small size of the "finger fly swatter" most insects do not react to its presence and are caught off-guard by the rapid flicking motion. Most insects are easily struck and swept away from one's body by the device of the present invention, resulting in permanent removal of the particular insect. The small inconspicuous size of the finger fly swatter allows for easy cleaning if needed. The device of the present invention is so effective in the dissuasion of insects that one often welcomes the presence of an insect so that it may be discouraged. The dissuasion of a particularly energetic insect often becomes a challenging sport.

In a preferred embodiment, a device of the present invention is removably attached to a finger by a ring-like structure. The ring-like structure is tailored to slip onto and engage a finger in various positions and remain attached to the finger when the finger is flicked. Joined to the ring-like structure is an extension shaft that terminates in an insect engagement head portion. The length and/or cross-sectional profile of the extension shaft can be altered as well as the shape of the head portion or ring-like structure.

BRIEF DESCRIPTION OF DRAWINGS

Shown in FIG. 1 is an isometric view of an insect dissuasion device resembling a miniature "fly swatter" according to a preferred embodiment of the present invention.

Shown in front view

Figure 5:
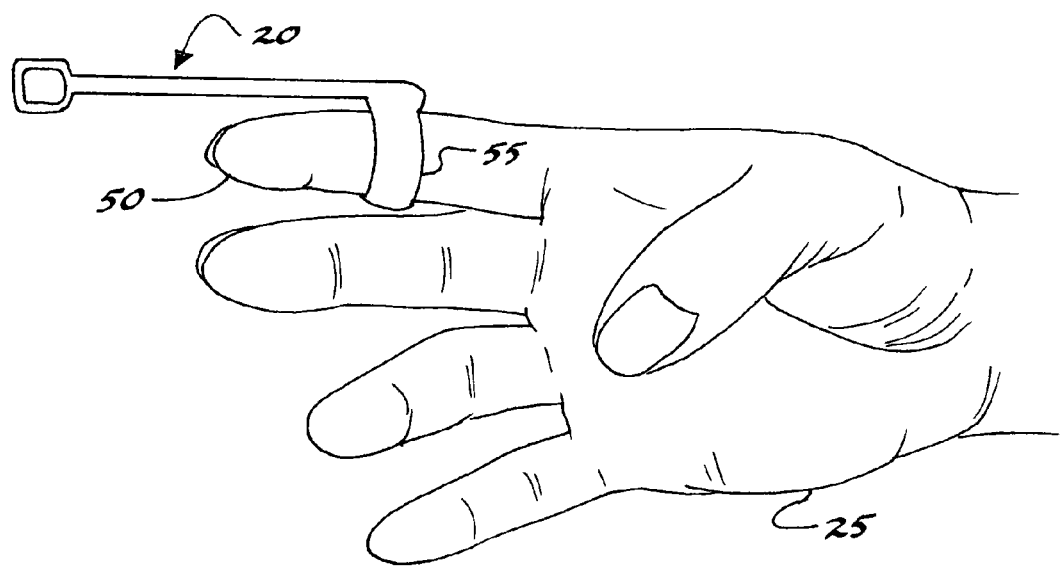

Shown in front view FIG. 5, a device of the present invention releasably attached to a middle phalanx bone of a human finger.

FIGS. 6A through 6D show respectively, top views of a device of the present invention positioned onto an outside, a top, an inside and a bottom surface of a human finger.

Figure 7:
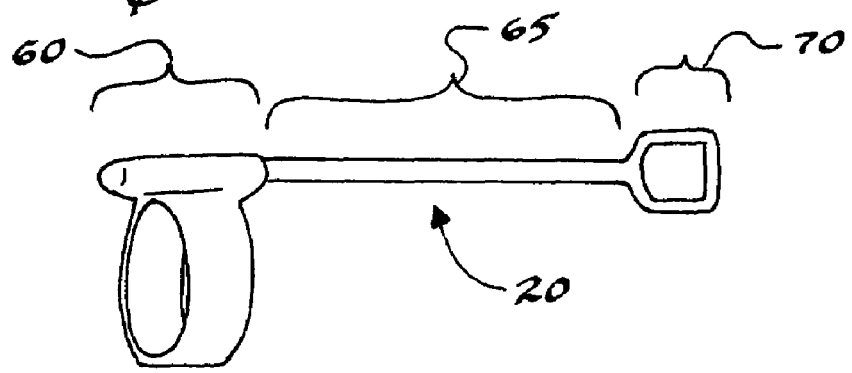

Shown in FIG. 7 is an isometric view of a preferred embodiment of an insect dissuasion device of the present invention. Shown is a finger engagement portion, an extension shaft and a head engagement portion.

Figure 8:
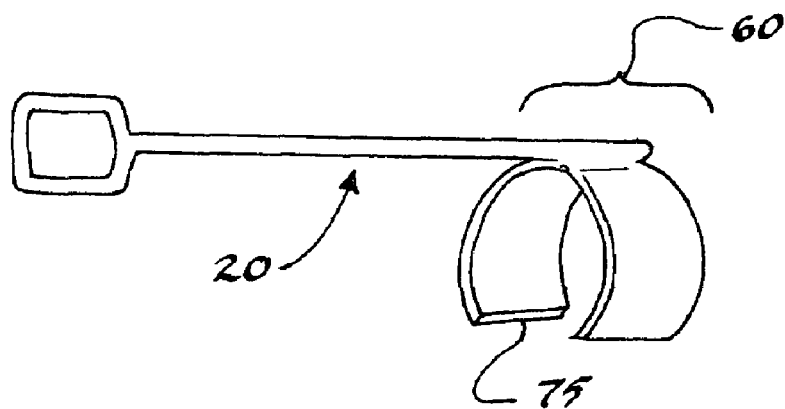

FIG. 8 is an isometric view of a device of the present invention having a slit in the finger engagement portion.

Figure 9:
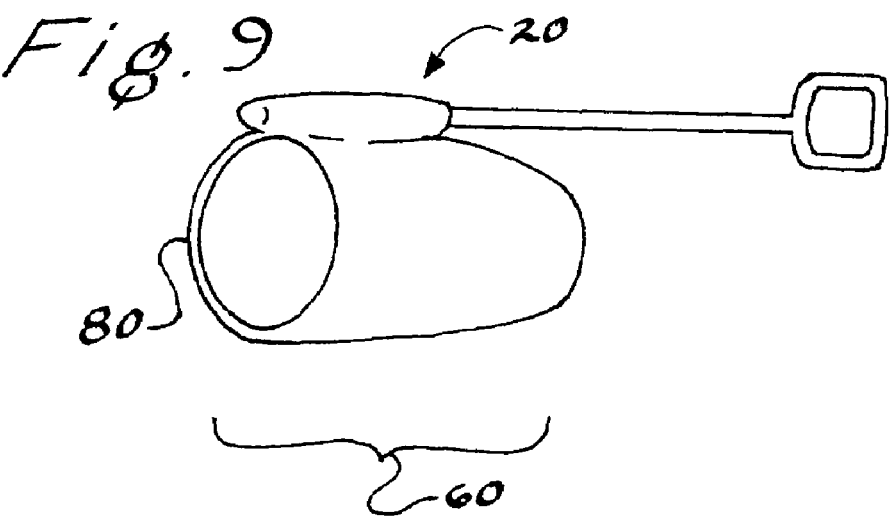

FIG. 9 is an isometric view of an alternate, sock or finger-cot configuration of a finger engagement portion of the present invention.

Figure 10:
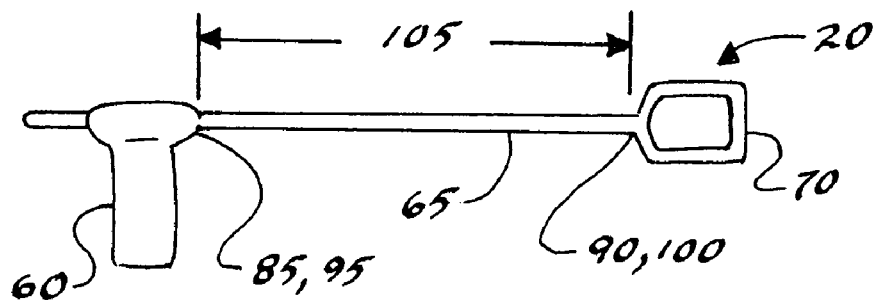

FIG. 10 is a side view of a device of the present invention showing end regions, coupling points and the length of an extension shaft of the present invention.

Figure 11:
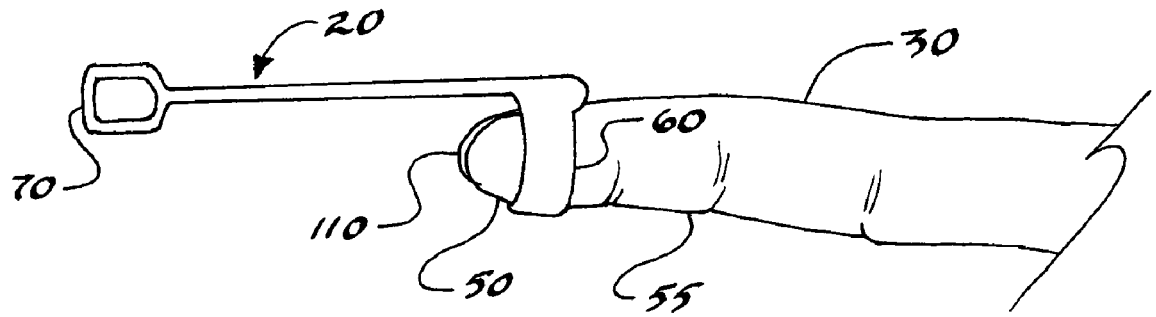

FIG. 11 is a side view of a device of the present invention showing a head portion that is positioned distally of the finger distal end.

Figure 12:
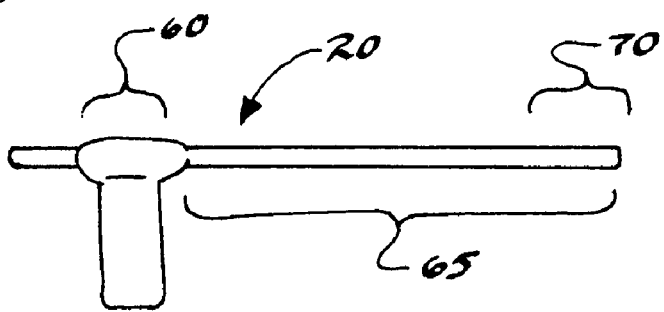

FIG. 12 is a side view of an alternate embodiment of the present invention having a head portion that is "integral" with the extension shaft.

Figure 13A:
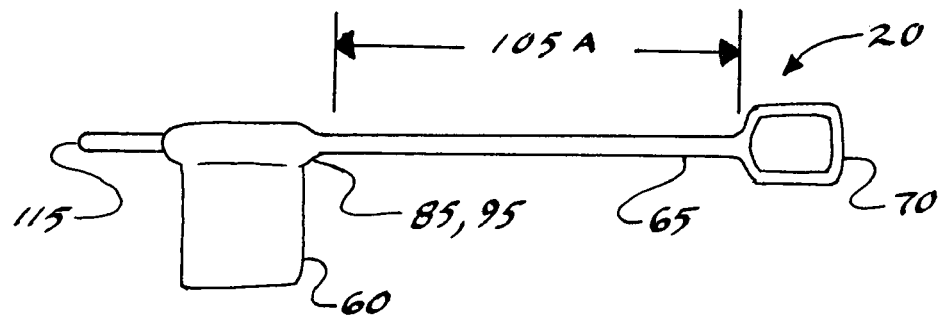
Figure 13B:
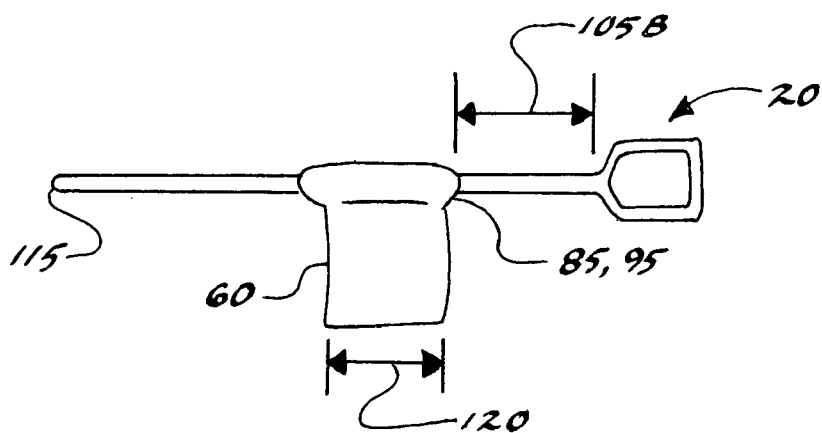

FIGS. 13A and 13B show side views of a device of the present invention. Depicted is an optional feature allowing length adjustment of an extension shaft.

Figure 14:
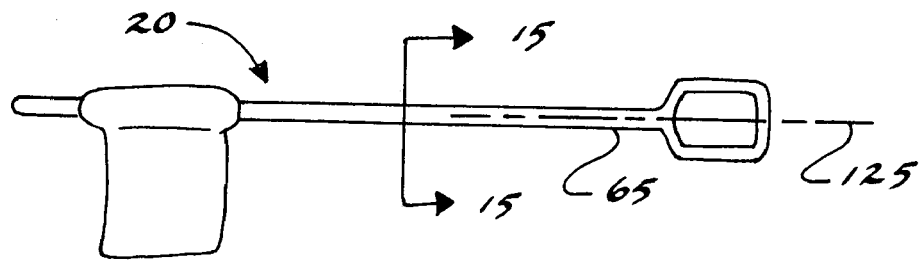

FIG. 14 is a side view of a device of the present invention defining a cross-sectional viewing plane of an extension shaft.

FIGS. 15A through 15H are examples of various extension shaft cross-sectional profiles according to the present invention.

FIGS. 16A through 16J are front or isometric view examples of various head portions according to the present invention (16I excluded for clarity).

Figure 17:
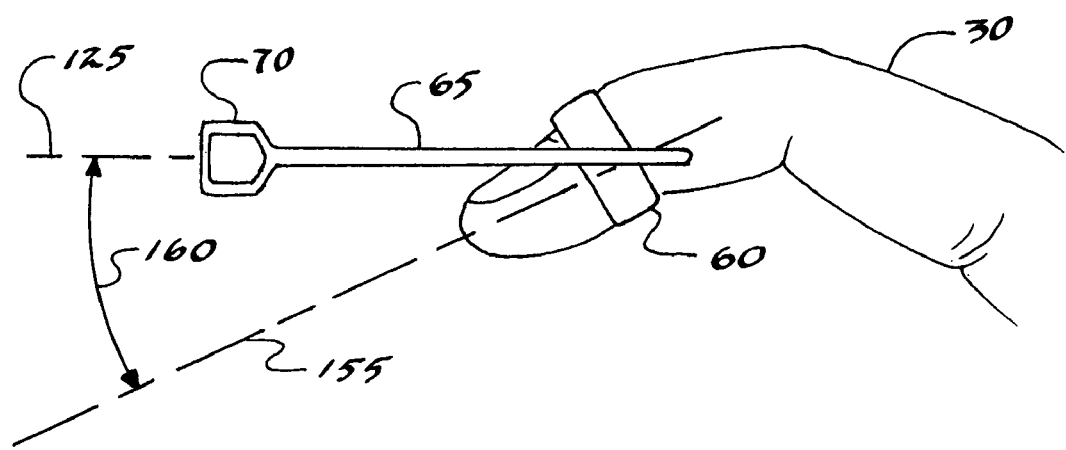

FIG. 17 is a top view of a finger with an attached device of the present invention. Shown is a finger longitudinal axis having an angular offset to the extension shaft longitudinal axis.

Figure 18:
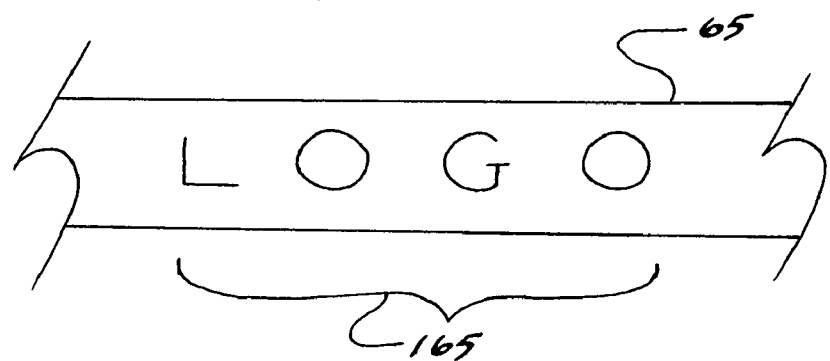

FIG. 18 is a partial top view of an extension shaft of the present invention displaying a printed logo.

Figure 19:
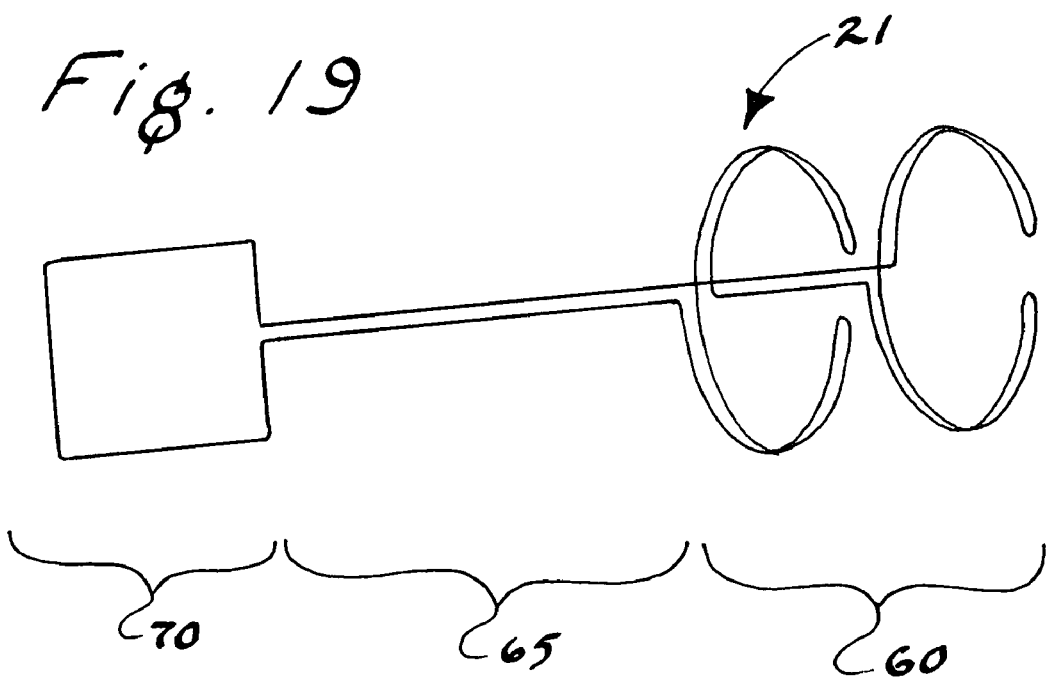

FIG. 19 is an isometric view of a wire-formed device of the present invention.

Figure 20:
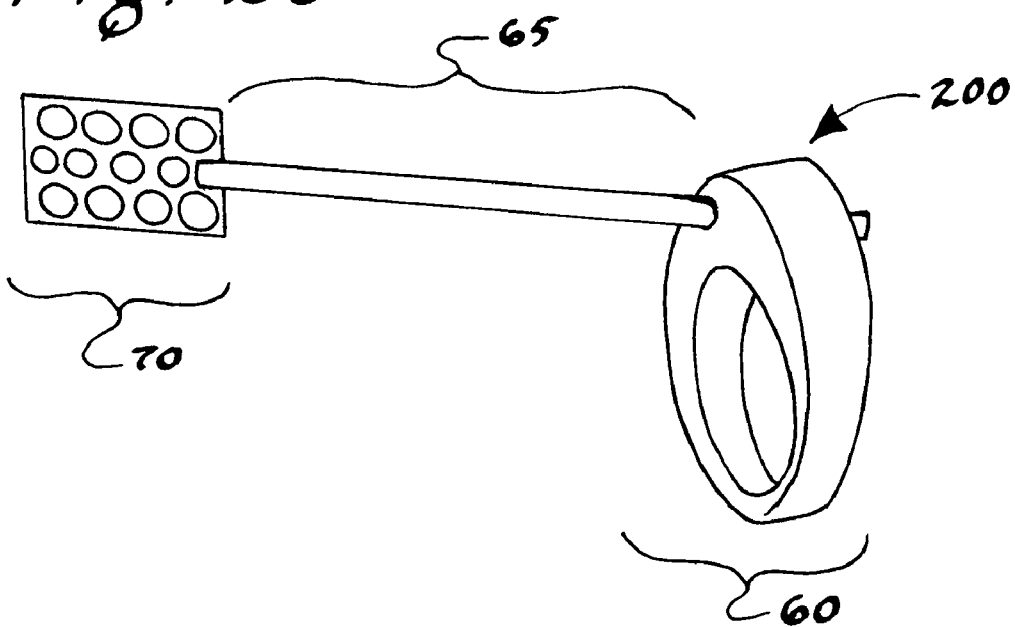

FIG. 20 is a solid model perspective view of a preferred embodiment of the present invention.

Figure 21:
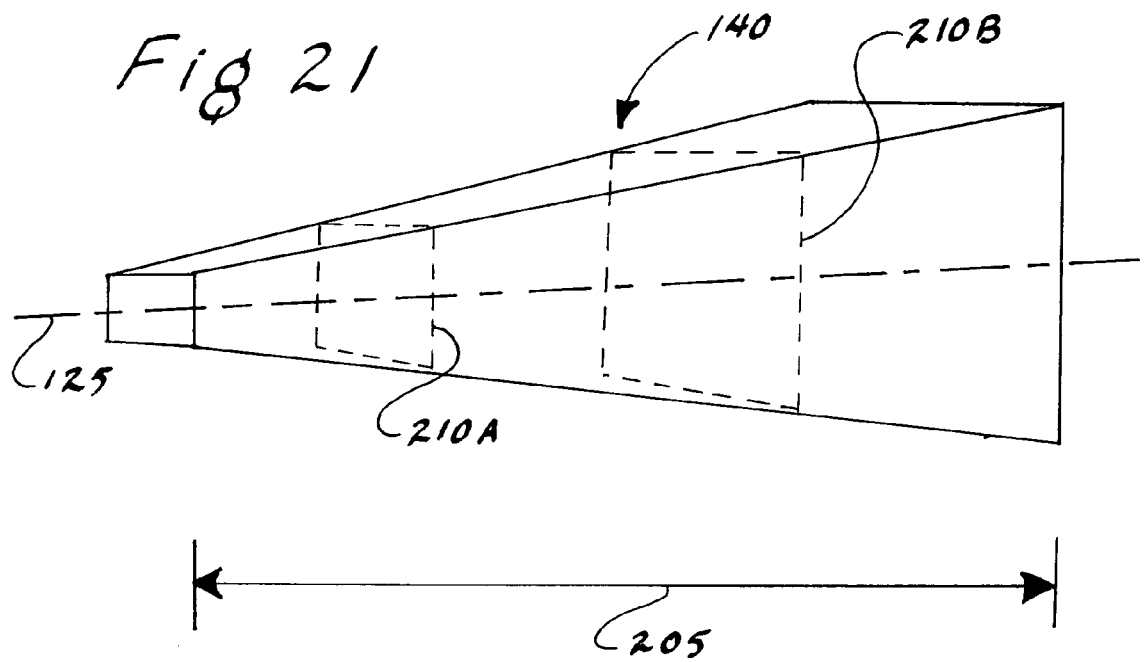

FIG. 21 is a perspective view of an extension shaft portion showing relations between cross-sectional perimeter lengths and overall shaft lengths.

Figure 22:
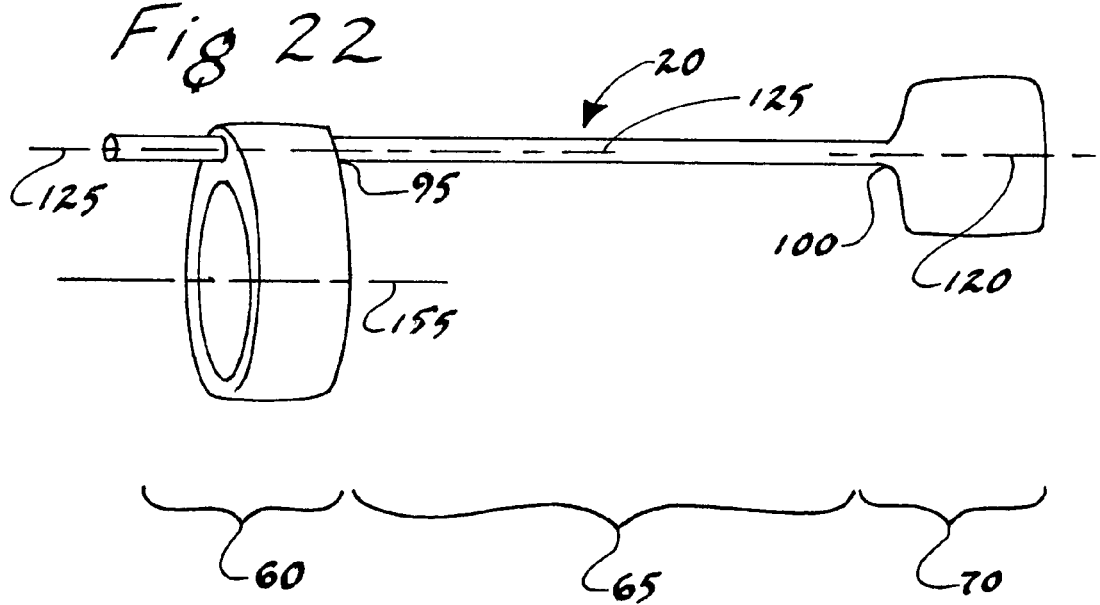

FIG. 22 is a side view of a device of the present invention defining angular relations between three longitudinal axis.

DETAILED DESCRIPTION OF DRAWINGS

The bones of the fingers (and toes) are known as phalanges (singular: phalanx). Each finger has three phalanges, with the exception of the thumb, which has only two. The phalanges are referred to by their position with respect to the body when the hand is extended. The bones at the ends of the fingers, because they are the most distant from the body, are the distal phalanges. The next are the middle phalanges (which the thumb does not have). Those articulating with the metacarpals of the hand are the proximal phalanges.

Figure 1:
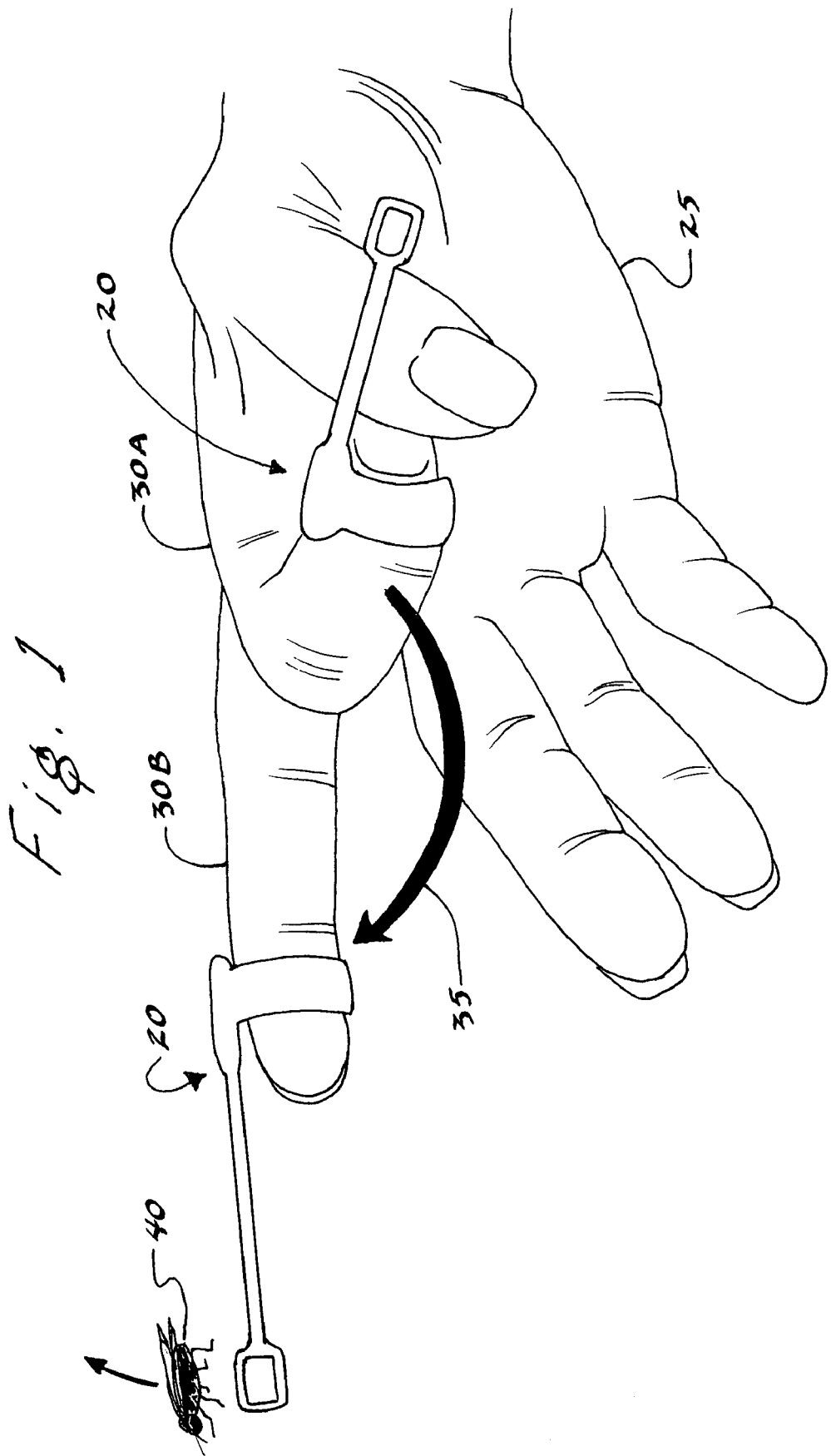

Shown in FIG. 1 is an insect dissuasion device 20 resembling a miniature "fly swatter" according to a preferred embodiment of the present invention. Shown is an isometric rendering of a human hand 25 having an index or first finger 30a in a "pre-flicked" or curled state. Releasably attached to the index finger 30a is an insect dissuasion device 20 of the present invention. From this position, the index finger and the attached device of the present invention can be "flicked" to strike an insect or other object. The term "flicked" as used herein is defined as a rapid transition of a finger from a contracted or curled state to an approximately linear extended state. The concept of "flicked" is illustrated in FIG. 1. The index finger is initially in a curled state 30a and is then rapidly moved 35 to an approximately linear extended state 30b. When the finger is flicked the attached device 20 of the present invention is used to contact or strike an insect 40 or other object. As an alternate to a finger flicking motion, the device of the present invention can be used with a simple striking motion wherein the finger is not initially curled as shown in FIG. 1.

The following definition excerpt from *Merriam-Websters Collegiate Dictionary,* 11'th Edition, comport with the usage of "strike":

STRIKE

Main Entry: 1 strike

2a: to aim and usually deliver a blow, stroke, or thrust (as with the hand, a weapon, or a tool)

3: to come into contact forcefully *two ships struck in mid channel*

1a: to strike at: HIT b: to drive or remove by or as if by a blow c: to attack or seize with a sharp blow (as of fangs or claws) "struck by a snake"

d: INFLICT "strike a blow"

9a(1): to bring into forceful contact

Figure 2:
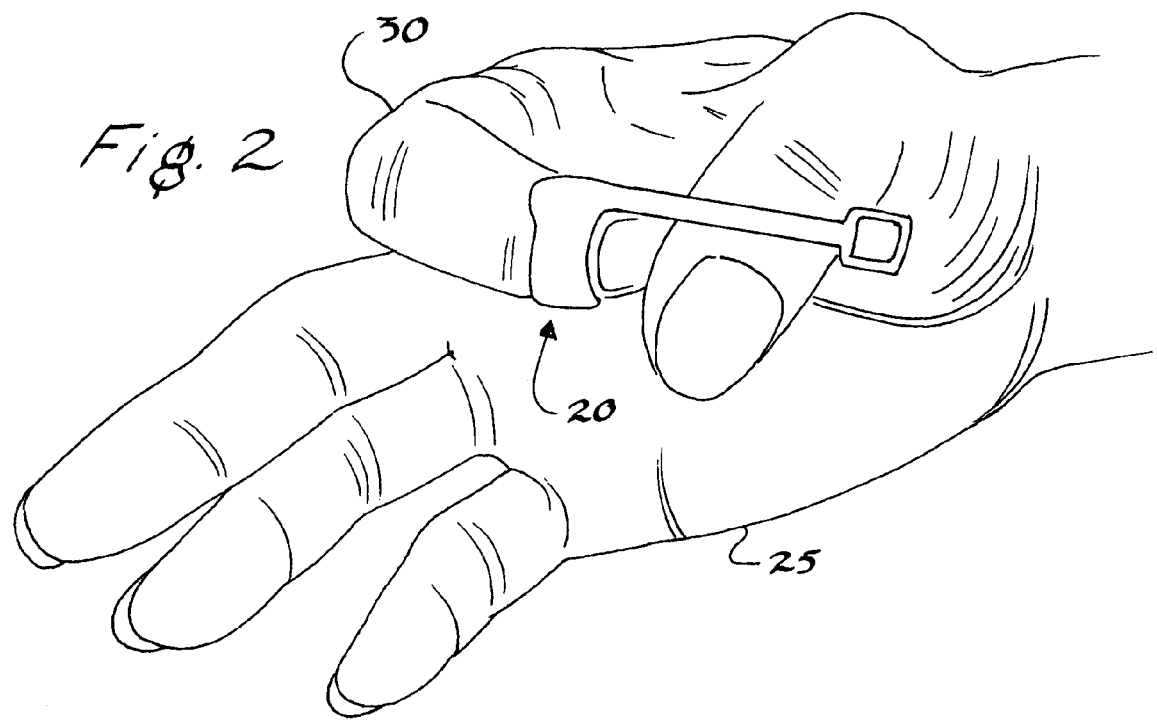
FIG. 2 is an isometric view of a device of the present invention releasably attached to an index finger.
Figure 3:
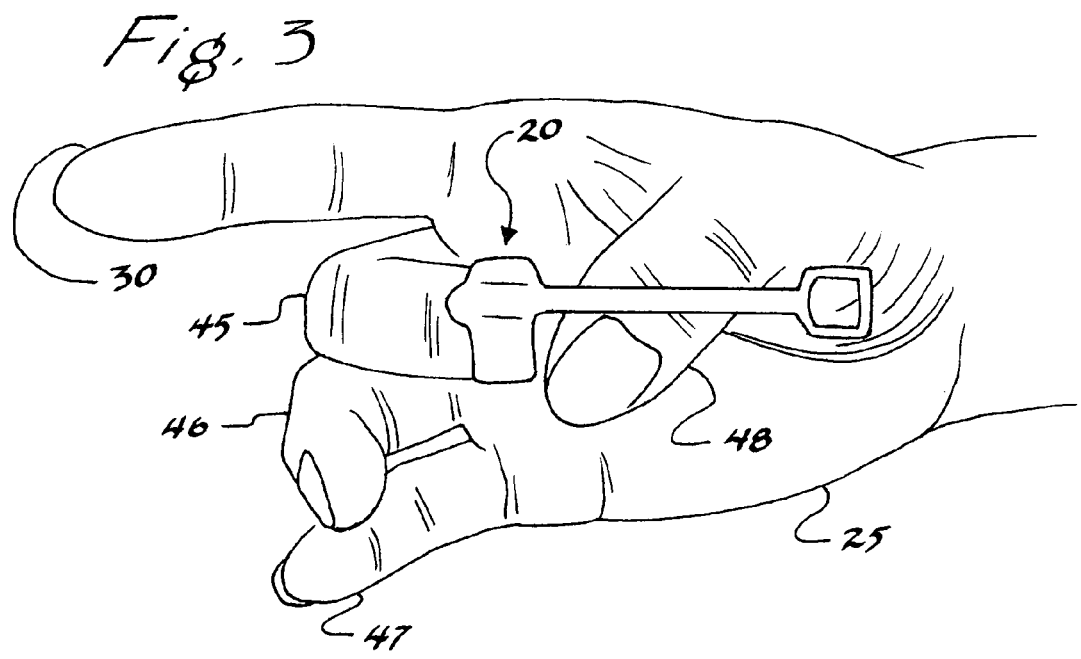
FIG. 3 is an isometric view of a device of the present invention releasably attached to a second finger.

There are several finger locations and orientations suitable for use with devices of the present invention. For example as shown in isometric FIG. 2, a device of the present invention 20 can be releasably attached to an index finger 30. In an alternate position shown in isometric FIG. 3, a device of the present invention 20 can be releasably attached to a second finger 45. Other digits of a hand that are suitable for attaching a device of the present invention include a third finger 46, a fourth finger 47 and a thumb 48.

Figure 4:
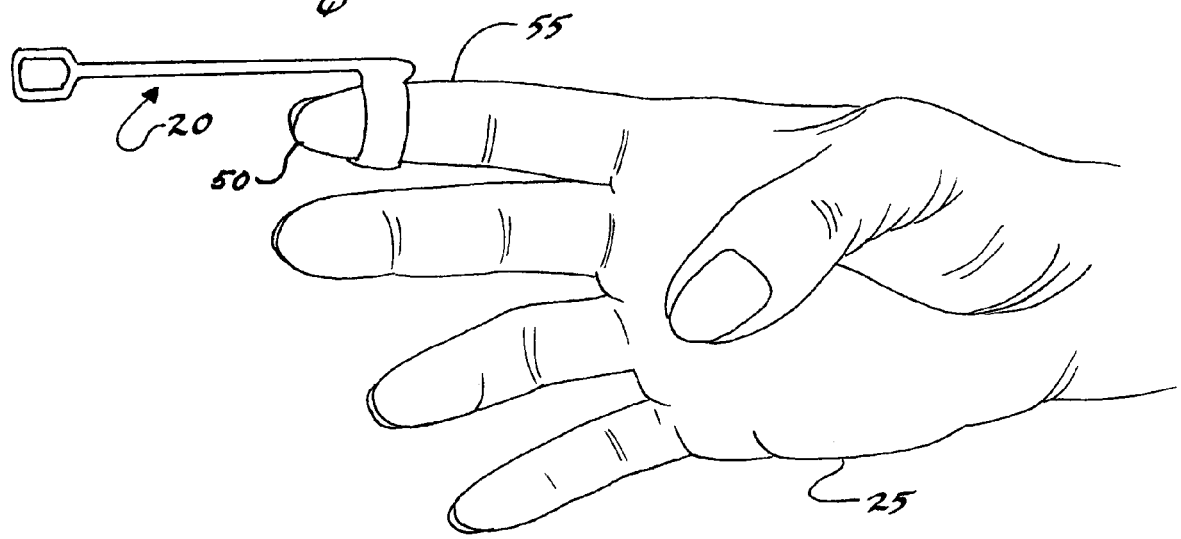
FIG. 4 is a device of the present invention releasably attached to a distal phalanx bone of a human finger.

Devices of the present invention can also be releasably attached to different phalanges of a finger. For example as shown in front view FIG. 4, a device of the present invention 20 can be releasably attached to a distal phalanx 50. In an alternate position shown in front view FIG. 5, a device of the present invention 20 can be releasably attached to a middle phalanx 55. Devices of the present invention can also be releasably attached to proximal phalanges. Although the effectiveness of the flicking motion is compromised, the attachment to a proximal phalanx provides a convenient means for "storing" a device of the present invention. When attached to a proximal phalanx, normal use of the hand is less impaired and a device of the present invention can be readily repositioned to a more effective flicking position.

Devices of the present invention can also be releasably attached onto and oriented about different angular positions of a finger. For example as shown in top view FIG. 6A, a device of the present invention 20 can be oriented about the outside or nail surface of a finger. Shown is a finger 30, a device of the present invention 20 having a finger engagement portion 60, an extension shaft 65 and a striking head portion 70. When oriented about the outside of a finger, the extension shaft 65 is adjacent to the outside or nail surface of a finger.

Figure 6A:
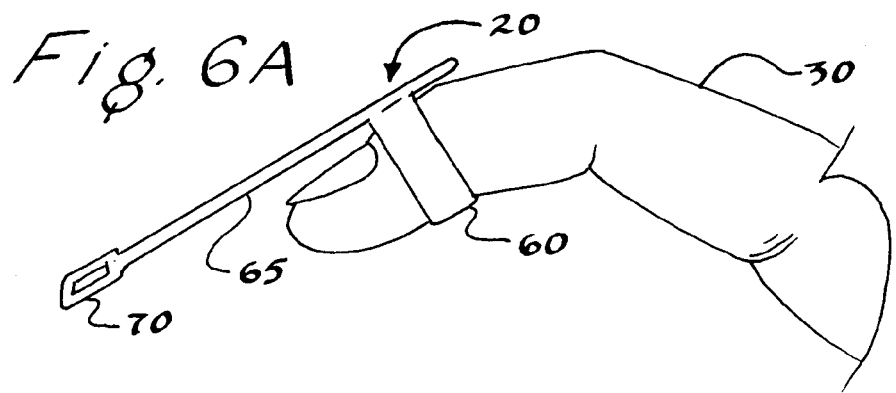
Figure 6B:
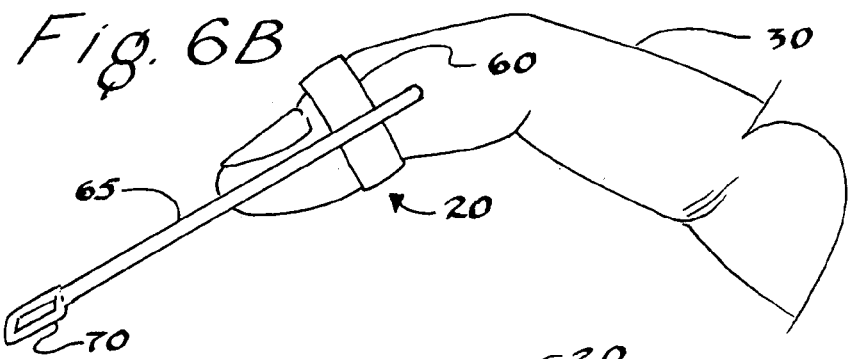
Figure 6C:
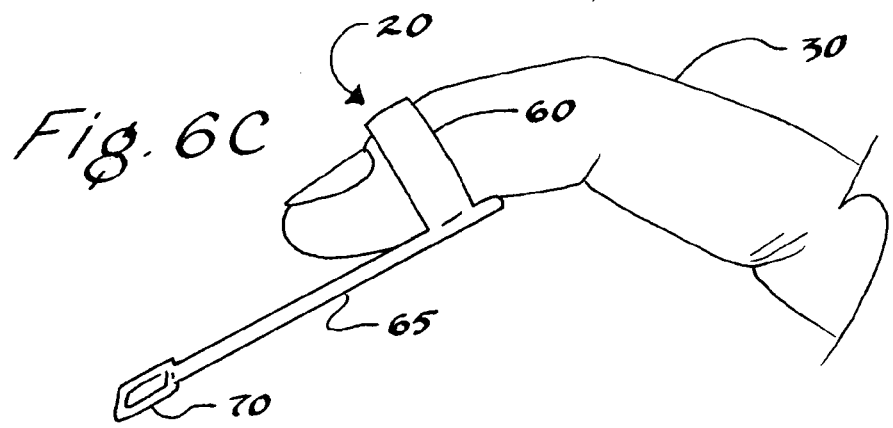

Alternately, a device of the present invention can be rotated about 90° from the position shown in FIG. 6A, so that an extension shaft 65 is adjacent the top side of a finger. This orientation of a device of the present invention is depicted in top view FIG. 6B showing a device on the top of a finger in an orientation similar to that shown in FIG. 1. Devices of the present invention can also be positioned so that an extension shaft 65 is adjacent an inside surface of a finger. Shown in top view FIG. 6C is a device of the present invention 20 oriented so that an extension shaft 65 is adjacent the inside surface of a finger. In this orientation a device of the present invention is rotated approximately 180° from the position shown in FIG. 6A, so that an extension shaft 65 is adjacent the inside surface of a finger.

Figure 6D:
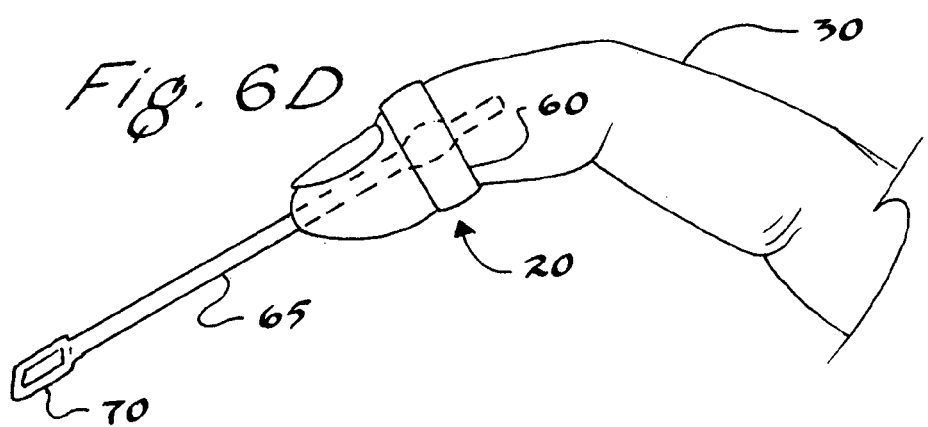

Devices of the present invention can also be positioned so that an extension shaft 65 is adjacent a bottom surface of a finger. Shown in top view FIG. 6D is a device of the present invention 20 oriented so that an extension shaft 65 is adjacent the bottom surface of a finger. In this orientation a device of the present invention is rotated approximately 180° from the position shown in FIG. 6B, so that an extension shaft 65 is adjacent the bottom surface of a finger.

Shown in FIG. 7 is a preferred embodiment of an insect dissuasion device 20 that resembles a miniature "fly swatter" adapted to be fixed onto an end of a human finger. A device 20 of the present invention preferably has a finger engagement portion 60, coupled to an extension shaft 65 that terminates into a head portion 70. In one embodiment, the finger engagement portion 60 can be configured to resemble and function like a common finger ring. In such a configuration, the finger engagement portion 60 is dimensioned to slip-fit onto and remain attached to a human finger. When desired, the ring-like structure can be "worked-loose" and removed, thereby being "releasably attached" to the finger. The finger engagement portion can be formed of a resilient, compliant material or be semi-rigid. The inside or finger-contacting surface of a finger engagement portion can optionally incorporate friction or retention enhancing features. Such features include but are not limited to high-friction coatings, pressure point protrusions or "fish scale-like" angled flaps that resist removal of a finger.

Optionally, a ring-like finger engagement portion 60 can incorporate a slit 75 as shown in isometric view FIG. 8. By incorporating a slit 75, a more rigid material such as a rigid plastic or ductile metal can be used to form the finger engagement portion 60. In this embodiment the finger engagement portion can be deformed by a user to accommodate the particular dimensions of a specific finger. As an alternate to a slit, a finger engagement portion of the present invention can also incorporate a circumferential "over-lap" (commonly found on finger rings) to provide user selected sizing.

Finger engagement portions 60 of the present invention can also utilize a "finger-cot" or slip-on cup configuration 80 as shown in FIG. 9. A cup 80 can be formed from a resilient, compliant material or be semi-rigid and sized to fit a specific range of finger dimensions.

Shown in FIG. 10 is a side view of a device of the present invention 20 having a finger engagement portion 60, an extension shaft 65 and a head portion 70. The extension shaft 65 has a first end region 85 coupled to the finger engagement portion 60 that defines a first coupling point 95. The extension shaft 65 has a second end region 90 coupled to the head portion 70 defining a second coupling point 100. The extension shaft has a length 105 defined as the approximate distance between the first coupling point 95 and second coupling point 100.

Shown in FIG. 11 is a side view of a device of the present invention 20 with a finger engagement portion 60 releasably attached to a distal phalanx 50 of an index finger 30. The finger 30 has a distal end 110 and the device head portion 70 is shown in a position that is distal to the finger distal end 110. The device head portion may also be juxtaposed to, adjacent to or proximal to the distal end 110 of a finger. The device head portion may also overlay or be in contact with the finger nail or any other portion of the finger.

An alternate embodiment of the present invention is shown in FIG. 12. Shown is a side view of a device of the present invention 20 having an engagement head portion 70 that is integral to an extension shaft 65. An "engagement head" is defined as any structure coupled to or integral to a finger engagement portion or extension shaft that has the intended purpose of striking an insect or other object.

In an alternate preferred embodiment, devices of the present invention can incorporate a slip or adjustable fit feature at the first coupling point between a finger engagement portion 60 and an extension shaft 65. This slip-fit feature allows a user to interchange various shafts or to adjust the effective length 105 of the extension shaft. Shown in side view FIG. 13A is a device of the present invention 20 having a head portion 70, an extension shaft 65 and a finger engagement portion 60. The coupling 95 between the extension shaft 65 and the finger engagement portion 60 allows the extension shaft to be adjusted to length 105a. Shown in side view FIG. 13B is a device of the present invention 20 wherein the extension shaft has been adjusted to a shorter length 105b. The first coupling point 95 has a slip fit feature that allows positional adjustment between the finger engagement portion and the extension shaft. Devices of the present invention can have extension shaft lengths 105 ranging from about 5 mm (0.2") to about 130 mm (5.2") or greater. A preferred range of extension shaft lengths 105 is from about 20 mm (0.8") to about 80 mm (3.2"). Extension shaft lengths of the present invention can be about 5 mm (0.2"), about 10 mm (0.4"), about 15 mm (0.6"), about 20 mm (0.8"), about 25 mm (1"), about 30 mm (1.2"), about 35 mm (1.4"), about 40 mm (1.6"), about 45 mm (1.8"), about 50 mm (2"), about 60 mm (2.4"), about 70 mm (2.8"), about 80 mm (3.2"), about 90 mm (3.6"), about 100 mm (4"), about 110 mm (4.4"), about 120 mm (4.8"), about 130 mm (5.2"0 or greater.

As shown in side view FIGS. 13A and 13B the proximal end 115 of the extension shaft is retracted (FIG. 13A) or extended (FIG. 13B) relative to the finger engagement portion 60. The slip-fit feature, allowing shaft interchangeability and adjustability, can be a properly sized through hole in the finger engagement portion that provides adequate friction between the through hole and the extension shaft. Deformable pinch points, adhesives, snap locks, set screws, wedges or any suitable means can be incorporated into the coupling point 95 to allow interchangeability, adjustment and retention of an extension shaft.

Also shown in FIG. 13B is a finger engagement portion 60 having a longitudinal length 120. Embodiments of the present invention can have finger engagement longitudinal lengths 120 ranging from about 1 mm (0.04") to about 20 mm (0.8"). A preferred range of finger engagement longitudinal lengths 120 is from about 3 mm (0.1") to about 15 mm (0.6"). A more preferred range of finger engagement longitudinal lengths 120 is from about 5 mm (0.2") to about 10 mm (0.4").

Extension shafts of the present invention can have various shapes and cross-sectional profiles. Shown in FIG. 14 is a side view of a device of the present invention 20 having an extension shaft 65 with a longitudinal axis 125. Cross-sectional plane 15 defines a viewing plane orthogonal to the longitudinal axis 125 of the extension shaft 65. FIGS. 15A through 15H are example cross-sectional views of extension shafts as viewed along a shaft longitudinal axis.

Figure 15A:
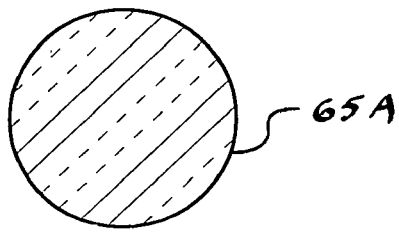

Shown in FIG. 15A is an extension shaft 65a that has a round or circular profile. Extension shafts can have an oval shaped, hollow tube shaped or partial tube shaped profile.

Figure 15B:
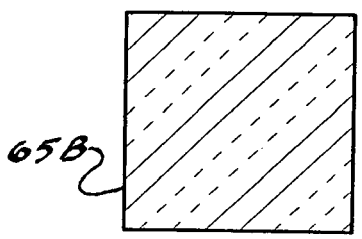

Shown in FIG. 15B is an extension shaft 65b having a square profile. Extension shafts can have a square hollow tube shaped or partial tube shaped profile.

Figure 15C:
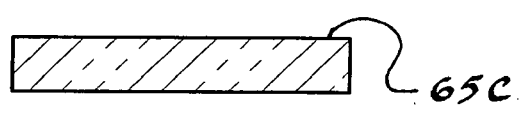
Figure 15D:
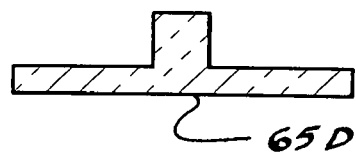

Shown in FIG. 15C is an extension shaft 65c having a rectangular profile and FIG. 15D depicts an extension shaft 65d having a "tee" shaped profile.

Figure 15E:
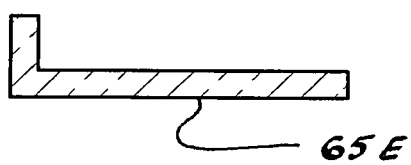
Figure 15F:
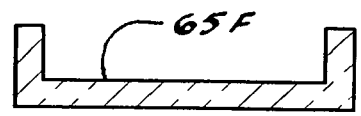

Shown in FIG. 15E is an extension shaft 65e having a "L" shaped profile and FIG. 15F depicts an extension shaft 65f having a channel or "C" shaped profile.

Figure 15G:
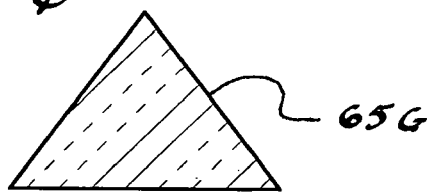
Figure 15H:
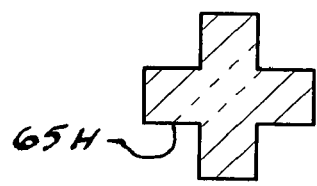

Shown in FIG. 15G is an extension shaft 65g having a triangular shaped profile and FIG. 15H depicts an extension shaft 65h having a "cross" shaped profile. Other possible cross-sectional profiles include polygons or irregular shapes.

A preferred embodiment of the present invention incorporates a slip or adjustable fit feature at the first coupling point between a finger engagement portion and an extension shaft. This slip-fit feature, generally depicted in FIGS. 13A and 13B, allows a user to interchange various shafts and to adjust or vary the effective length of the extension shaft. The example profiles shown in FIGS. 15A through 15H can be adapted to slip fit into a matching hole in a finger engagement portion. Specific profiles can allow various adjustments of the angular relation between a finger engagement portion and an extension shaft or between an extension shaft and a head portion. For example a round profile allows infinite angular adjustment (or rotation along the extension shaft longitudinal axis) between the two components. A regular triangular shaped profile, as shown in FIG. 15G, allows three angular positions, while a square profile (FIG. 15B) or a cross profile (FIG. 15H) allow four angular orientations.

Figure 16A:
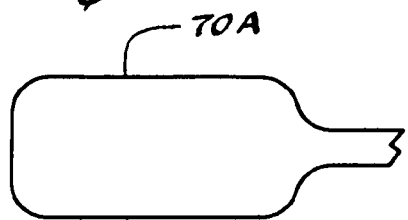
Figure 16B:
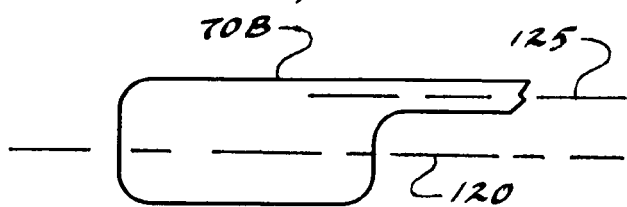

Devices of the present invention can have head portions of various configurations examples of which are shown in side view FIGS. 16A through 16J (16I excluded for clarity). Shown in FIG. 16A is a head portion 70a having a paddle shape. Shown in FIG. 16B is a paddle shaped head portion 70b having a centerline axis 120 that is offset from the extension shaft longitudinal axis 125.

Figure 16C:
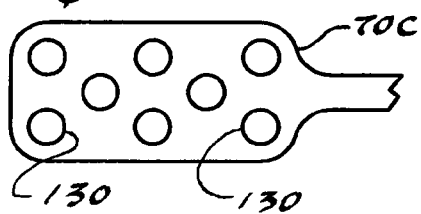
Figure 16D:
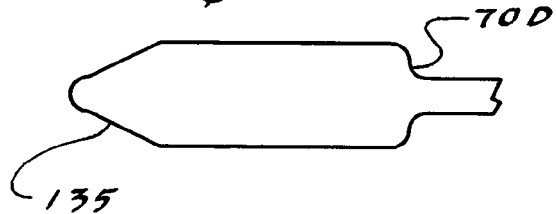

Shown in FIG. 16C is a paddle shaped head portion 70c having holes, spikes or dimples 130. Shown in FIG. 16D is a paddle shaped head portion 70d having a tapered or pointed shaped tip 135.

The following definition excerpt from *Merram-Webster's Collegiate Dictionary*, 11'th Edition, comport with the usage of "paddle":

PADDLE
   Main Entry: 2 paddle
      1a: a usually wooden implement that has a long handle and a broad flattened blade and that is used to propel and steer a small craft (as a canoe) b: an implement often with a short handle and a broad flat blade that is used for stirring, mixing, or hitting; especially: one used to hit a ball in any of various games (as table tennis)
      2b: any of the broad blades attached to a shaft (as in an ice cream machine) and used for stirring A paddle head portion can be further defined as a three dimensional shape having a length, a height and a thickness. The length and height define a striking surface or plane that is perpendicular to a "striking axis" that is parallel to the finger flicking axis as shown in FIG. 1, item 35. The length is at least equal to the height. The thickness is less than about ⅓ of the smaller of the length or height. The striking surface may have through holes or may have a concave or convex profile. The paddle head portion is joined to an elongate shaft or handle.

Figure 16E:
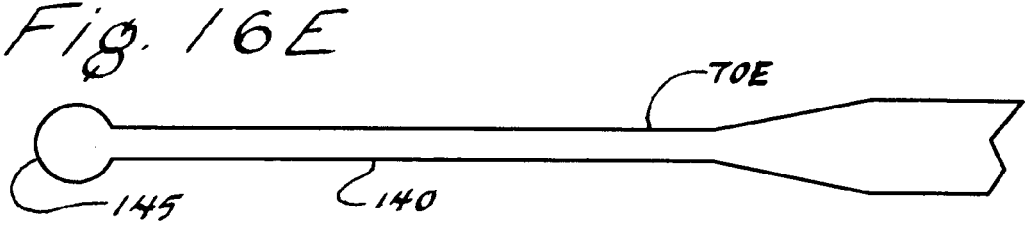

Shown in FIG. 16E is a "whip" shaped head portion 70E having a thin elongate portion 140 terminating in a ball 145. The ball 145 can incorporate spikes and can be of any bulbous shape. Other whip-like configurations can include, but are not limited to, whips not having a bulbous shape near the end as generally depicted in FIG. 12.

Figure 16F:
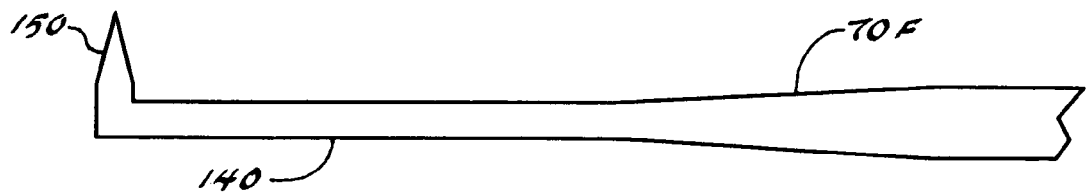

Shown in FIG. 16F is a "whip" shaped head portion 70F having a thin elongate portion 140 terminating in a spike 150. Multiple spikes 150 can be incorporated into the terminal end of the elongate structure 140.

A whip-like configuration can have various cross-sectional profiles and have a length equivalent to the "extension shaft" lengths previously defined.

The following definition excerpt from *Merriam-Websters Collegiate Dictionary*, 11'th Edition, comport with the usage of "whip":

WHIP
   Main Entry: 2 whip
      1: an instrument consisting usually of a handle and lash forming a flexible rod that is used for whipping
      7: the quality of resembling a whip especially in being flexible 8: WHIP ANTENNA Rod shaped head portions can also be incorporated into the present invention. A "rod" shaped head is similar to a whip except the rod is generally stiffer and less flexible than a whip. Such rod shapes can have various cross-sectional profiles, shown for example in FIGS. 15A through 15H. A rod-like configuration can have a length equivalent to the "extension shaft" lengths previously defined.

The following definition excerpt from *Merriam-Webster's Collegiate Dictionary*, 11'th Edition, comport with the usage of "rod":

ROD
   Main Entry: rod
      1a(1): a straight slender stick growing on or cut from a tree or bush b(1): a slender bar (as of wood or metal)

Shown in FIG. 16G is a "rake" shaped head portion 70G having a thin elongate portion 140 terminating in a rake configuration 170. The rake configuration includes at least two elongate fingers and is similar in shape to a common "leaf rake" or fork.

Shown in FIG. 16H is a "human hand" shaped head portion 70H having a thin elongate portion 140 terminating in a human hand configuration 175. The human hand can have an open, slapping configuration as shown or have a "closed fist" configuration.

Shown in FIG. 16J is a "butterfly net" shaped head portion 70J having a thin elongate portion 140 terminating in a butterfly net configuration 180.

Other striking head configurations adaptable to the present invention can include, but are not limited to shapes such as blocks, coiled springs, baseball bats, hockey sticks, tennis rackets, golf clubs, leg portions with a kicking boot, boxing gloves, swords, animal shapes such as cobra snakes, sharks, predator birds and "alien monsters".

Shown in FIG. 17 is a device of the present invention 20 attached to a finger 30 having a distal phalanx longitudinal axis 155. Also shown is an extension shaft longitudinal axis 125. An optional or adjustable angle 160 can be incorporated into devices of the present invention allowing the distal phalanx longitudinal axis 155 to have an angular offset to the extension shaft longitudinal axis 125. Other alternate embodiments of the present invention include a finger-mounted fly swatter having double or two-ring-like finger engagement portions. The two ring-like or other structures can be releasably attached to a single finger bone segment or onto two different bone segments. Such devices can include the incorporation of a pivot mechanism at one or more of the coupling points between a finger engagement portion and an extension shaft. Devices of the present invention can also incorporate a deformable extension shaft so that a user can form and set arcs, twists or other shapes onto an extension shaft. As shown in FIG. 18, devices of the present invention can be labeled or patterned with logos, trademarks, tradenames or other visual indicators. Shown in partial top view FIG. 18 is an example logo 165 printed onto an extension shaft 65.

Shown in FIG. 19 is an alternate embodiment of an insect dissuasion device according to the present invention. Shown in FIG. 19 is a wire-formed device of the present invention 21 having a finger engagement portion 60, coupled to an extension shaft 65 that terminates into a head portion 70.

Shown in FIG. 20 is a preferred embodiment of the present invention. Shown is a solid model of a device 200 of the present invention having a finger engagement portion 60, coupled to an extension shaft 65 that terminates into a striking head portion 70. The coupling point between the extension shaft 65 and the finger engagement portion 60 incorporates a tight slip fit feature that allows interchangeability of various extension shafts with different striking head configurations. The slip fit feature also allows adjustability of the effective length of the extension shaft. The longitudinal axis of the extension shaft has an angular offset of about 30° from the longitudinal axis of a human distal phalanx as shown in FIG. 17.

Shown in FIG. 21 is a general perspective view of a portion of an extension shaft 140 according to the present invention. As shown the shaft 140 has various cross-sectional perimeters 210A, 210B that are perpendicular to the shaft longitudinal axis 125 as viewed along the shaft longitudinal axis 125. To be considered a "shaft" within the scope of the present invention, two cross-sectional perimeters, separated by at least about 10 mm (0.4"), each must have an overall perimeter length that is substantially less than the overall length 205 of the shaft.

The following definition excerpt from *Merriam-Webster's Collegiate Dictionary*, 11'th Edition, comport with the usage of "shaft":

Main Entry: 1 shaft
   1a (1): the long handle of a spear or similar weapon (2): SPEAR, LANCE: POLE; c (1): an arrow especially for a longbow (2): the body or stem of an arrow extending from the nock to the head 3: something suggestive of the shaft of a spear or arrow especially in long slender cylindrical form: as a: the trunk of a tree b: the cylindrical pillar between the capital and the base c: the handle of a tool or instrument (as a golf club) e: the stem or central axis of a feather f: the upright member of a cross especially below the arms g: the cylindrical part of a long bone between the enlarged ends h: a small architectural column (as at each side of a doorway) i: a column, obelisk, or other spire-shaped or columnar monument Shown in FIG. 22 is a side view of a device 20 of the present invention showing preferred angular relations between three longitudinal axis. Shown is a finger engagement portion 60, attached to an extension shaft 65 that terminates into a striking portion 70. The finger engagement portion 60 has a longitudinal axis 155 that is coincident with the distal phalanx longitudinal axis (as defined in FIG. 17). The extension shaft 65 has a longitudinal axis 125 (as defined in FIGS. 14 and 17). The striking head portion 70 has a longitudinal axis 120 (as defined in FIG. 16B). In a preferred embodiment of the present invention, the finger engagement longitudinal axis 155 is parallel to or forms an angle within about ±70° to the extension shaft longitudinal axis 125. The extension shaft therefore protrudes within a cone having a central axis parallel to the finger engagement portion longitudinal axis. The cone has an included angle of about 140° with an apex coincident with the shaft to finger engagement coupling point 95 (as defined in FIGS. 10, 13A and 13B).

The extension shaft longitudinal axis 125 is also parallel to or forms an angle within about ±30° to the striking head longitudinal axis 120. The striking head longitudinal axis therefore protrudes within a cone having a central axis parallel to the extension shaft longitudinal axis. The cone has an included angle of about 60° with an apex coincident with the shaft to striking head coupling point 100 (as defined in FIG. 10).

Finger engagement portions, extension shafts and head portions of the present invention can all be of the same material or these components can be of different materials. For example a finger engagement portion and a head portion of the present invention can be fabricated from a plastic and combined with an extension shaft fabricated from a metal. Finger engagement portions, extension shafts and head portions of the present invention can be formed from numerous materials. These materials include but are not limited to polymers such as polyethylene, polypropylene, polyvinyl chloride, styrenics, polyurethanes, thermoplastic elastomers, nylons, polycarbonate, polyethylene terephthalate, phenolics, thermoset polyesters, silicones, rubber and acetals. Other suitable materials include metals and alloys of gold, silver, tin, nickel, irons, steels, aluminum, coppers and nitinol. Materials used to fabricate components of the present invention can vary in the degree of, for example, rigidity, stiffness, elasticity, toughness, deformability or compliance depending on the configuration and intended purpose of the specific component. Casting, injection molding, compression molding, insert molding, machining, stamping/forming, photo-etching/forming, stereo lithography, wire forming or any other suitable manufacturing method can be used to fabricate devices of the present invention.

EXAMPLE #1

Plastic rings of various sizes and stiffness were procured from a party supply outlet. The selected rings typically had a flat or large oval top portion representing a gem or stone molded onto a finger engagement portion. A typical flat portion of a ring had a surface area of approximately 10 mm (0.4") by 10 mm (0.4") or larger. The rings were typically soft and compliant and could expand to fit tightly onto finger having a diameter of about 15 mm (0.6") to about 20 mm (0.8"). Using a razor, a shallow groove or vee-shaped channel was cut into the top surface of the ring portion that simulated a flat gemstone. The cut channel was about 10 mm (0.4") long, by about 1 mm (0.04") wide and about 1 mm (0.04") deep. This channel was then used to align and mount an extension shaft and head portion onto the finger engagement portion.

A large paper clip having a plastic coated wire with a diameter of about 1.5 mm (0.06") was bent and formed into a rectangular head portion and an extension shaft. The head portion was about 15 mm (0.6") by 8 mm (0.3") and the overall length of the extension shaft and head portion was about 50 mm (2"). The formed wire was then attached to the channel in the top surface of the ring with a 10-minute two part epoxy. After curing the epoxy, the assembly had the general appearance of the device 20 shown in FIG. 10. The modified ring with the attached shaft and head portion was then positioned onto various fingers, finger locations and finger orientations. In an initial outdoor trial, 4 flies and several ants were easily and effectively dissuaded within a 20-minute period.

Although the invention has been described in conjunction with specific embodiments, it is evident that many alterations and variations will be apparent to those skilled in the art in light of the foregoing descriptions and annexed drawings. Accordingly, the invention is intended to embrace all of the alternatives and variations that fall within the spirit and scope of the appended claims.

I claim:

1. A method of deterring an insect, comprising:
    a) supplying an insect deterrent device comprising an extension shaft having a length and first and second opposing end regions, the first shaft end region joined to a finger attachable ring-like structure, the second shaft end region joined to a striking head, the shaft having two cross-sectional perimeters separated by at least about 10 mm with each perimeter having a length that is substantially less than the shaft length, the ring-like structure, extension shaft and striking head each having a longitudinal axis, the ring-like structure longitudinal axis being parallel to or forming an angle within about ±70° to the extension shaft longitudinal axis, the extension shaft longitudinal axis being parallel to or forming an angle within about ±30° to the striking head longitudinal axis;
    b) releasably attaching the ring-like structure with joined shaft of the deterrent device to a human finger having a distal tip which is not a thumb such that the ring-like structure circumscribes only a single human finger and so that the striking head is positioned distal to the finger distal tip;
    c) forming the finger with the attached deterrent device into a pre-flicked or curled state;
    d) flicking the curled finger to cause the striking head of the deterrent device to strike an insect.

2. The method of claim 1 wherein the striking head has a ball shape.

3. The method of claim 1 wherein the extension shaft with joined striking head is releasably attached to the ring-like structure.

* * * * *